United States Patent [19]

Koblenzer

[11] 4,390,396

[45] Jun. 28, 1983

[54] APPARATUS FOR THE DISTILLATION OF VAPORIZABLE LIQUIDS

[75] Inventor: Heinz Koblenzer, Filderstadt, Fed. Rep. of Germany

[73] Assignee: Langbein-Pfanhauser Werke AG, Neuss, Fed. Rep. of Germany

[21] Appl. No.: 256,599

[22] Filed: Apr. 22, 1981

[30] Foreign Application Priority Data

Apr. 23, 1980 [DE]  Fed. Rep. of Germany ....... 3015525

[51] Int. Cl.³ .............................................. B01D 3/02
[52] U.S. Cl. ..................................... 202/166; 202/167; 202/170; 202/233; 202/234; 62/238.5; 134/12; 203/95; 203/100; 203/DIG. 4
[58] Field of Search ................... 203/DIG. 4, 100, 92, 203/95, 19, DIG. 13; 202/170, 163, 166, 167, 233, 234, 235; 134/12, 11; 126/361; 62/238.5, 238.6, 238.7

[56] References Cited

U.S. PATENT DOCUMENTS

| | | | |
|---|---|---|---|
| 1,116,804 | 11/1914 | Daley | 202/166 |
| 1,331,600 | 2/1920 | Wales | 62/238.5 |
| 2,777,514 | 1/1957 | Eckstrom | 62/238.5 |
| 3,070,463 | 12/1962 | Barday | 202/170 |
| 3,483,092 | 12/1969 | Young | 202/233 |
| 4,003,798 | 1/1977 | McCord | 203/DIG. 4 |
| 4,142,379 | 3/1979 | Kuklinski | 62/238.6 |
| 4,293,323 | 10/1981 | Cohen | 62/238.6 |

Primary Examiner—Wilbur L. Bascomb, Jr.
Attorney, Agent, or Firm—Karl F. Ross; Herbert Dubno

[57] ABSTRACT

An apparatus for the distillation of vaporizable liquids, for example alcohol, solvents used for the degreasing of metal and the like, comprises a distillation chamber, a heating unit in the region of the bottom of the distillation chamber, a cooling and condensation unit at an upper portion of the distillation chamber and a cold-generating unit. According to the invention, the cold-generating unit is formed as a heat pump with a circulating refrigerant and has a compressor, a cold branch and a hot branch. The cold branch is connected to the cooling and condensation unit of the distillation chamber while the hot branch transfers heat via a heat exchanger to a heat storage device, e.g. a utility water reservoir from which hot water is drawn to heat the heating unit of the distillation chamber.

3 Claims, 2 Drawing Figures

APPARATUS FOR THE DISTILLATION OF VAPORIZABLE LIQUIDS

FIELD OF THE INVENTION

My present invention relates to an apparatus for the distillation of vaporizable liquids and, more particularly, to an energy-conserving distillation system of compact construction for the distillation of vaporizable liquids of all types, e.g. alcohol, degreasing solvents and the like.

BACKGROUND OF THE INVENTION

Distillation systems are commonly provided for recovering alcohol, solvents and the like and can include a distillation chamber adapted to receive the liquid to be distilled, a heating unit in heat exchanging contact with the liquid in this chamber, a cooling and condensing unit in contact with a vapor phase of liquid from this chamber and means for cooling the latter unit.

Such apparatus can be used, for example, for the distillation of alcohol from alcoholic liquids or mixtures, for the distillation of solvents, e.g. to clean the latter, and for any other purpose in which a vaporizable liquid must be distilled.

For the cleaning (generally degreasing) of metals with solvents, the solvent is highly contaminated by oils, fats and like greasy materials as well as with other contaminants. Economical reuse of such solvents requires their cleaning and purification and industrial methods make use of distillation for this purpose.

Distillation apparatuses for the aforedescribed purposes have heretofore generally utilized heating units which were electrically energized or which received thermal energy from some external source. The cooling unit could be a refrigeration unit which was also driven by electrical energy and which released heat into the surroundings.

With increasing energy shortages and energy costs, such apparatus was not technologically advantageous, nor was it compatible with increasing concern for environmental thermal pollution and energy wastage.

OBJECTS OF THE INVENTION

It is the principal object of my present invention to provide an improved distillation apparatus for the purposes described which is energetically more efficient than the earlier systems.

Another object of the invention is to provide a compact, simple and economical distillation apparatus for the distillation of alcohols and hydrocarbon degreasing solvents whereby the disadvantages of earlier systems are obviated.

SUMMARY OF THE INVENTION

These objects and others which will become apparent hereinafter are attained, in accordance with the present invention, in a distillation apparatus for the distillation of any vaporizable solvent and particularly for the distillation of alcohols and hydrocarbon degreasing solvents, which comprises a distillation chamber adapted to receive the liquid to be distilled, a heating unit in heat exchanging relationship with the liquid in this chamber, a condensing unit in contact with the vapor phase generated by heating of the liquid in the distillation chamber, and a heat pump having hot and cold branches.

The heat pump, through which a heat-carrying liquid continuously recirculates, e.g. a conventional refrigerant such as a FREON, has its cold branch in heat-transferring relation to the condenser for the solvent vapors while the hot branch is in heat exchanging relationship via a heat exchanger with a body of water forming a heat storage means and from which heat is drawn to operate the heating unit for evaporating the liquid in the distillation chamber.

The heating branch can thus have a heat exchanger which operates a utility water boiler and heat storage tank from which hot water is circulated through the heating unit.

The heat pump can comprise, in the usual manner, a compressor connected between the cold branch and the hot branch in the circulating path of the heat carrier, i.e. the refrigerant.

It will be apparent from the foregoing that the heat generated by the heat pump and abstracted from the solvent vapors upon their condensation can be collected in the utility water boiler and heat storage tank with the resulting heat, in the form of utility water, being utilized for various purposes including the vaporization of the liquid in the distillation chamber.

According to a feature of the invention, when steam distillation is desirable, as it is in many cases, I generate steam by the heating of water in this boiler and supply the generated steam to the distillation chamber.

The supply of steam to the distillation chamber has been found to be advantageous particularly in the case of metal-degreasing solvents because the steam forms, in the distillation chamber, an azeotrope of water and solvent whose boiling point is less than that of the pure solvent so that the solvent can be evaporated at a lower temperature.

This eliminates the danger of overheating the solvent in spite of the fact that all but traces of the latter can be evaporated in the distillation vessel.

The condenser can be disposed in the distillation chamber as well and can be provided with a trough within which the condensate collects and from which the condensate, i.e. the pure liquid, can be drawn off for further use or storage.

When the heat developed by the heat pump is greater than that which can be accommodated by the utility water boiler and heat storage tank, the hot branch of the heat pump can be provided with an air-cooled heat exchanger to dissipate the excess heat. In general, this air-cooled heat exchanger, which is provided with a blower, is not mandatory or is only utilized from time to time.

The cooling branch of the pump can include the condenser of the distillation chamber, i.e. the condenser of the latter chamber can be connected directly in the cold branch of the heat pump.

However, it has been found to be advantageous to utilize a heat transfer liquid in this stage as well.

Thus according to another feature of the invention, the cold branch of the heat pump is provided with a heat exchanger in contact with a body of the heat transfer liquid, e.g. water, and the cooling water is circulated through the condenser. In this case, the body of cold water is available for other uses as well, e.g. as a cooling water source, or as a cold-storage reservoir.

The cold water storage tank and the hot water storage tank can be provided in a single vessel separated by an insulating partition, the heat pump being mounted on this vessel to form a particularly compact structure.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
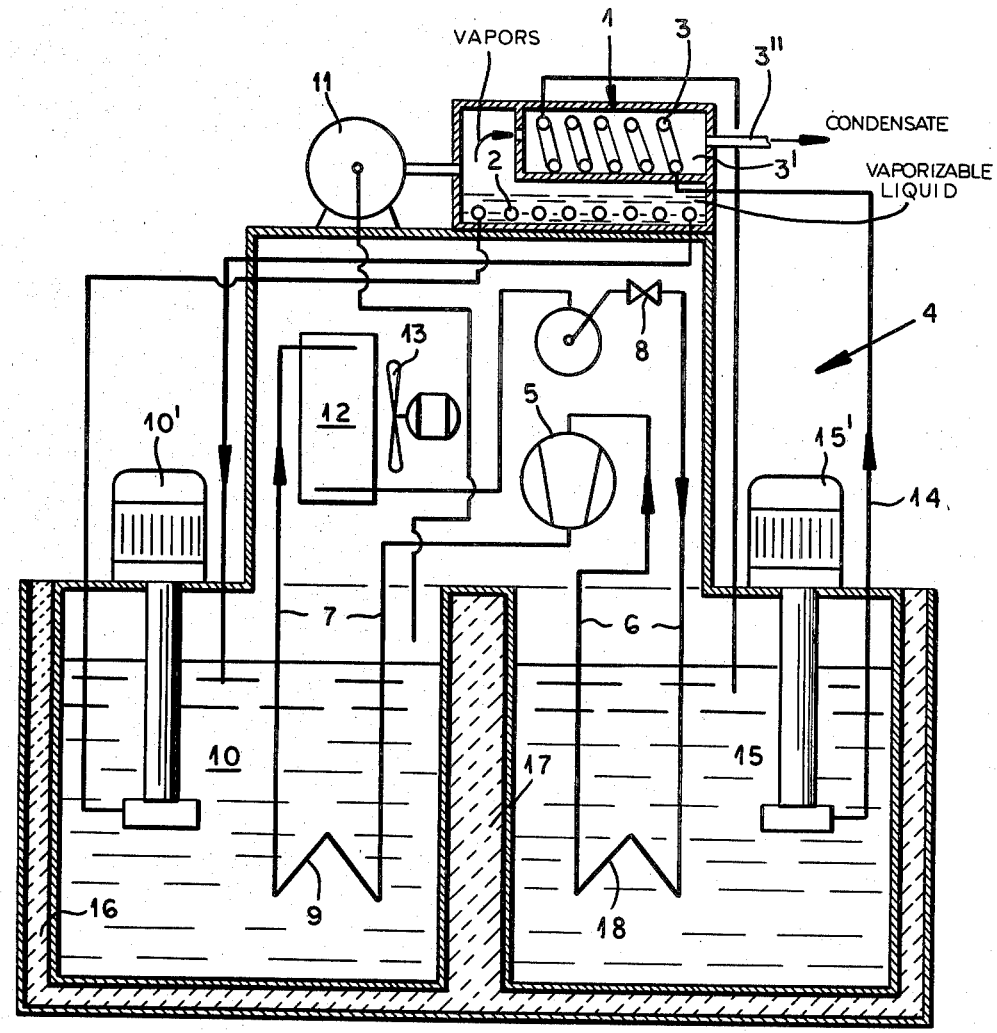
FIG. 1 is a diagram of a distillation apparatus according to the invention, partly in vertical section.

The apparatus shown in the drawing is intended for the distillation of vaporizable liquids, for example alcohol and solvents, especially chlorinated hydrocarbon solvents from the degreasing of metals and comprises a distillation chamber 1 at the bottom of which is provided a heating unit 2 in the form of a coil traversed by a heating liquid. At an upper part of the distillation chamber 1 there is provided a condensing unit, in the form of a pipe coil 3 traversed by a cooling fluid, a trough 3' collecting the condensate which can be led off as indicated by the arrow through the pipe 3".

The means for introducing the liquid to this chamber and for receiving the condensate has not been illustrated.

According to the invention, the distillation apparatus also comprises a heat pump generally represented at 4 and in which a heat-carrying fluid is circulated, the fluid advantageously being a refrigerant such as a chlorofluorohydrocarbon or a fluorocarbon, i.e. a FREON.

The heat pump comprises the usual compressor 5, at the high pressure side of which a heating branch 7 is provided. The low pressure side of the compressor is connected to a cooling branch of the heat pump.

In accordance with conventional heat pump principles, the refrigerant is compressed by the compressor and the compression heat is dissipated in the heat branch 7, thereby condensing the refrigerant which is permitted to expand through an expansion valve or throttle 8. The expansion is a cooling process and cools the branch 6 with the latter abstracting heat and the resulting refrigerant, now in vapor form, returning to the compressor 5.

The cooling branch 6 is connected to the condenser 3 in a heat transferring relationship as will be described below while the heating branch 7 is in heat transferring relationship to the heater 2.

The heating branch 7 of the heat pump 4 is formed with a heat exchanger 9 in heat exchanging relationship with a body of water in a utility water boiler and heat storage tank 10. Water from this tank is circulated by the pump 10' through the heater 2.

The boiler 10 also generates steam, the steam being drawn by a blower 11 from the tank 10 and forced through the distillation chamber 1.

The hot branch 7 of the heat pump also includes a radiator 12 and a fan 13 to air cool the circulating heat carrier, the fan 13 being used only when the boiler 10 does not have sufficient capacity to abstract heat from the hot branch 7.

The cold branch 6 is in heat exchanging relationship via a heat exchanger 18 with a body of water in a tank 15 which can be referred to as a cold water boiler, storing the cold water that is circulated by a pump 15' via line 14 through the condensor 3.

Figure 2:
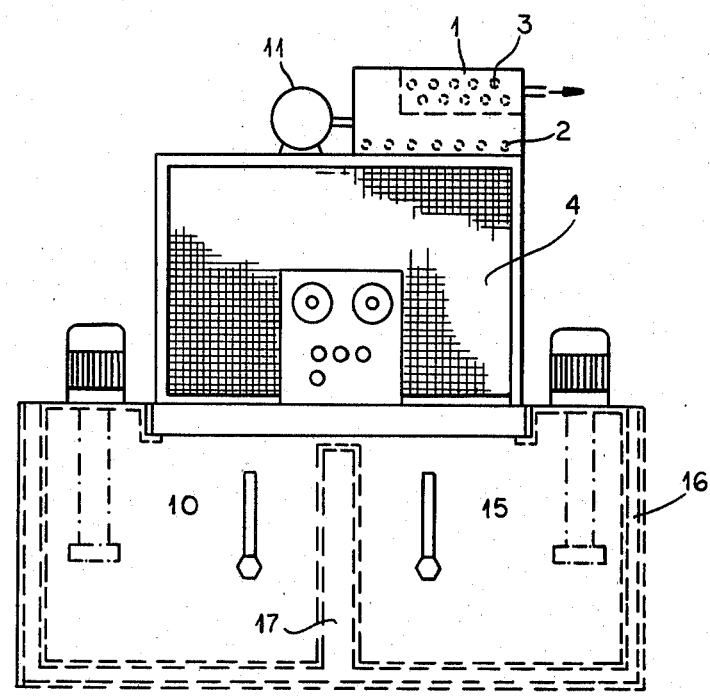
FIG. 2 is a front-elevational view of the apparatus of FIG. 1.

As will be apparent from FIGS. 1 and 2, the two tanks 10 and 15 are provided in a common vessel 16 with a thermally insulating partition 17 between them. Above the vessel, the heat pump 4 can be mounted.

During distillation, the heat drawn from the boiler is delivered to the heater 2 to vaporize the solvent which is condensed by the coil 3 through which cold water is circulated from the tank 15. The heating of the water in tank 10 derives from the hot branch of the heat pump while the cold water is cooled by the cold branch of the heat pump.

I claim:

1. A distillation apparatus comprising:
   a distillation chamber adapted to receive a vaporizable liquid to be distilled;
   a heater in said chamber for heating said liquid to vaporize same;
   a steam-generating hot-water storage tank and a cold-water storage tank;
   means for circulating hot water from said hot-water storage tank through said heater to heat said liquid and produce vapor in said chamber;
   a condenser connected to said chamber for receiving said vapor and condensing same;
   means for circulating cold water from said cold-water storage tank through said condenser for cooling same;
   a heat pump forming a closed-loop circulating path for a refrigerant having a full heat-pump circuit including a compressor, a hot branch leading from said compressor, a cold branch leading to said compressor, and a pressure reduction means between said hot and cold branches, said hot branch including a first heat exchanger forming a condenser for said refrigerant and immersed in said hot-water storage tank for heating the water therein, said cold branch including a second heat exchanger immersed in said cold-water storage tank for cooling the water therein; and
   a blower for drawing steam from said hot-water storage tank and blowing said steam into said chamber.

2. The apparatus defined in claim 1 wherein said hot branch includes an air cooler in series with said first heat exchanger.

3. The apparatus defined in claim 2 wherein said tanks are provided in a common vessel and are separated by a thermally insulating partition, said heat pump being mounted on said vessel.

* * * * *